(12) United States Patent
Lu

(10) Patent No.: US 6,626,384 B2
(45) Date of Patent: Sep. 30, 2003

(54) CONTROL DEVICE FOR PREVENTING SPOOL OF FISHING REEL FROM ROTATING

(76) Inventor: Han-Chi Lu, No. 22, Jien Ren Street, Taichung City (TW)

( * ) Notice: Subject to any disclaimer, the term of this patent is extended or adjusted under 35 U.S.C. 154(b) by 77 days.

(21) Appl. No.: 09/962,680

(22) Filed: Sep. 26, 2001

(65) Prior Publication Data

US 2003/0057308 A1 Mar. 27, 2003

(51) Int. Cl.[7] .............................................. A01K 89/01
(52) U.S. Cl. ..................................................... 242/239
(58) Field of Search ................................ 242/224, 234, 242/238, 239, 240

(56) References Cited

U.S. PATENT DOCUMENTS

| | | | | |
|---|---|---|---|---|
| 2,675,193 A | * | 4/1954 | Hull | 242/234 |
| 2,915,258 A | * | 12/1959 | Hull | 242/238 |
| 3,022,961 A | * | 2/1962 | Sawamura et al. | 242/239 |
| 3,061,231 A | * | 10/1962 | Gayle | 242/239 |
| 3,062,474 A | * | 11/1962 | Clark | 242/240 |
| 3,097,813 A | * | 7/1963 | Golec | 242/240 |
| 3,142,454 A | * | 7/1964 | Hull | 242/238 |
| 3,284,019 A | * | 11/1966 | Wood | 242/239 |
| 3,602,453 A | * | 8/1971 | Holmes | 242/309 |
| 4,760,974 A | * | 8/1988 | Swisher | 242/240 |
| 4,997,143 A | * | 3/1991 | Grice | 242/311 |
| 5,803,384 A | * | 9/1998 | Epperson | 242/234 |
| 6,054,571 A | * | 4/2000 | Jolicoeur et al. | 536/23.5 |

* cited by examiner

Primary Examiner—Emmanuel Marcelo
(74) Attorney, Agent, or Firm—Charles E. Baxley

(57) ABSTRACT

A control device for preventing the shaft of fishing reel from rotating includes a plate pivotally connected to the body of the reel and a hook is defined in an end of the plate. A shaft is connected to a spool portion of the reel and has a groove defined in an outer periphery of the shaft. The hook is disengagably engaged with the groove so as to prevent the shaft from being rotated when the release button is unintentionally touched.

2 Claims, 4 Drawing Sheets

CONTROL DEVICE FOR PREVENTING SPOOL OF FISHING REEL FROM ROTATING

FIELD OF THE INVENTION

The present invention relates to a control device which is controlled by the user to hook on the spool so that even if the line release button is pushed unintentionally, the fishing line will not be released.

BACKGROUND OF THE INVENTION

A conventional fishing reel 10 is shown in FIG. 1 and includes a casing with a spool portion 100 on a first end of the casing and a crank handle 11 connected to a side of a second end of the casing. The crank handle 11 is used to retrieve the fishing line by rotating the spool portion 100. A release button 12 is located on a top of the second end of the casing and is designed to have a large area so that the user can conveniently touch the release button 12 to release the fishing line. However, the release button 12 is touched unintentionally so often and no proper control device is provided to prevent such unexpected situation. The unexpected release of the fishing line is not welcomed by the users.

SUMMARY OF THE INVENTION

In accordance with one aspect of the present invention, there is provided a fishing reel which comprises a casing with a body received therein. A spool portion is connected to a first side of the body and a shaft extends from a second side of the body. A pinion is connected to the shaft and a gear is engaged with the pinion and is driven by a crank handle. A release button is connected to the casing and the shaft is located beneath the shaft. A plate is pivotally connected to the body and a first end of the plate is disengagably engaged with the shaft.

The primary object of the present invention is to provide a fishing reel wherein the shaft of the spool portion is held by a plate even if the release button is unintentionally touched.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
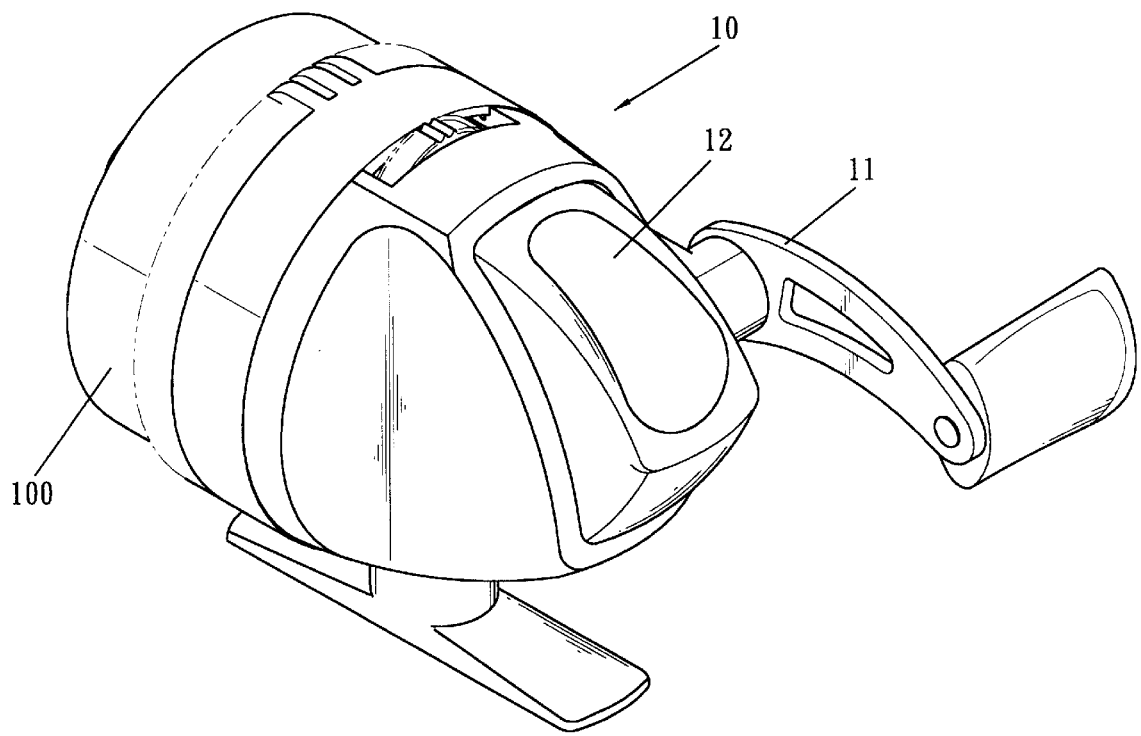
FIG. 1 is a perspective view to show a conventional fishing reel.
Figure 2:
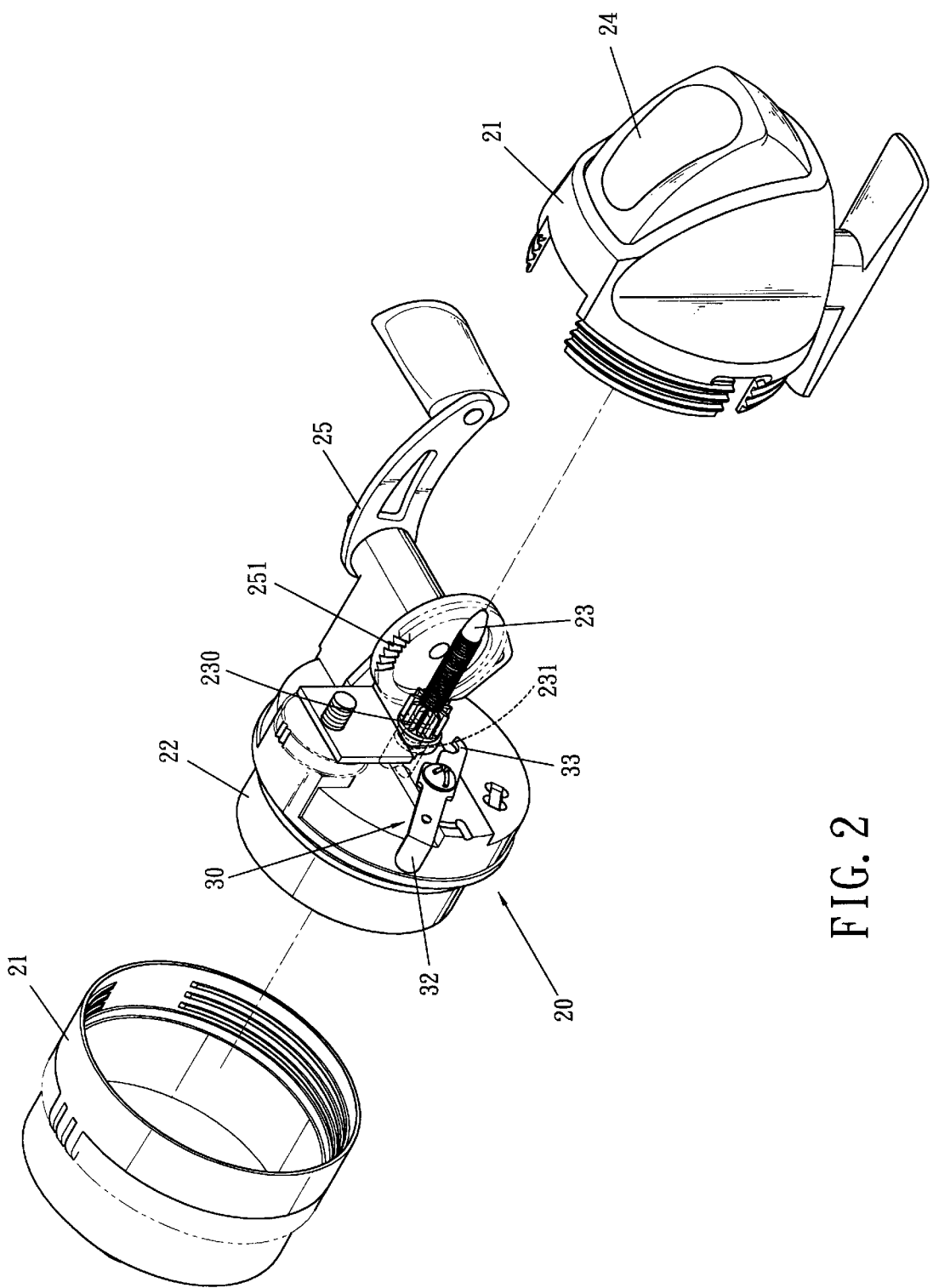
FIG. 2 is an exploded view to show a fishing reel of the present invention.
Figure 3:
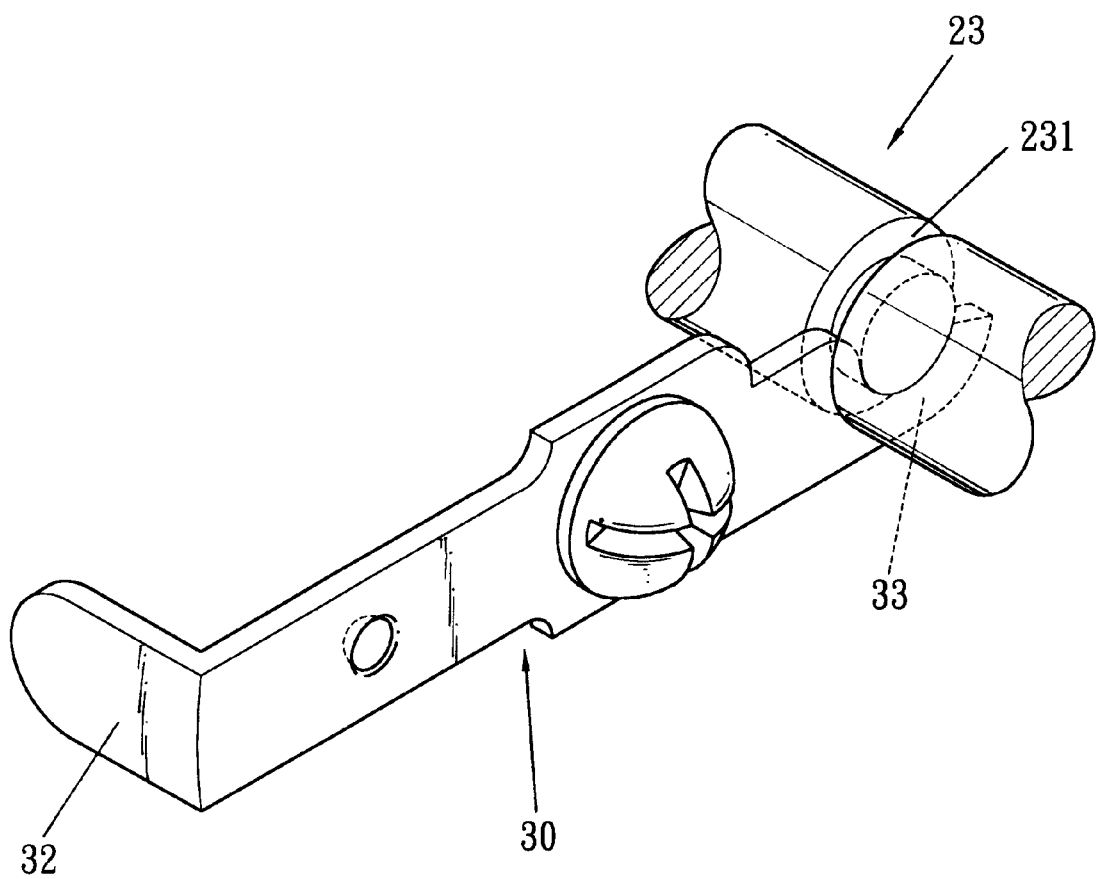
FIG. 3 is a perspective view to show the plate is engaged with the shaft of the spool portion.
Figure 4:
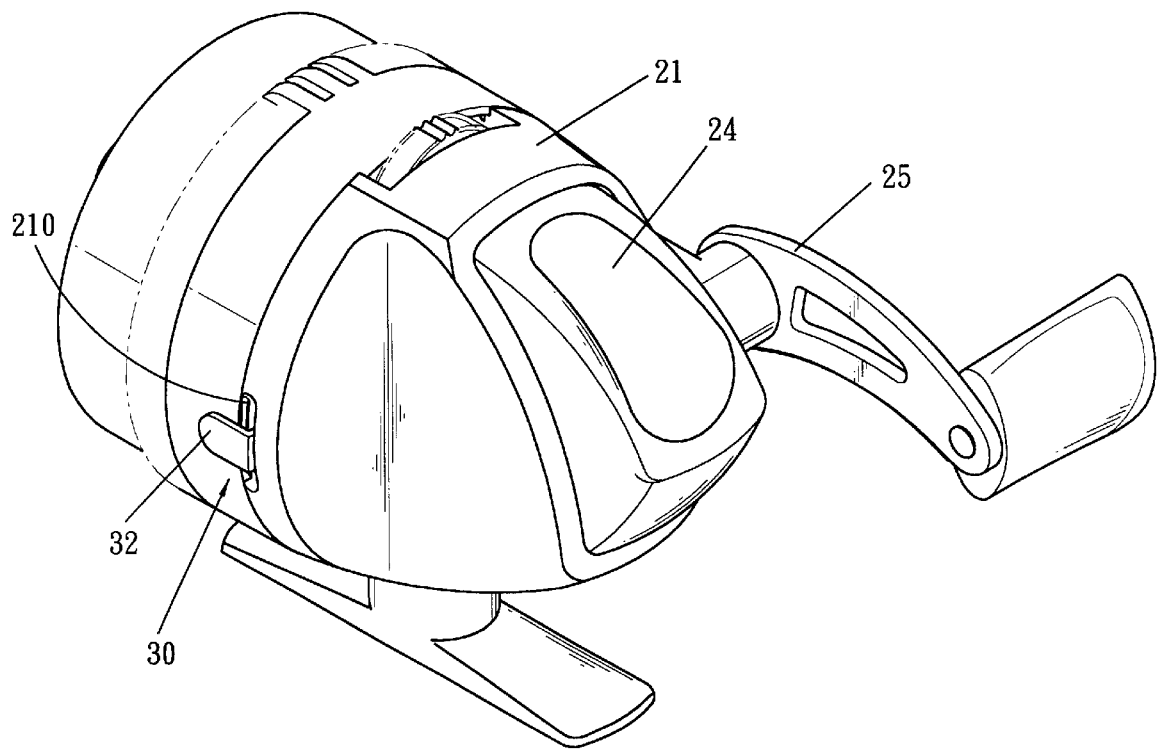
FIG. 4 is a perspective view to show the fishing reel of the present invention.

Referring to FIGS. 2 to 4, the fishing reel of the present invention comprises a casing 21 which is composed of two parts and a body 20 is received in the casing 21. A spool portion 22 is connected to a first side of the body 20 and a shaft 23 of the spool portion 22 extends from a second side of the body 20. A groove 231 is defined in an outer periphery of the shaft 23. A pinion 230 is co-axially connected to the shaft 23 and a gear 251 is engaged with the pinion 230. The gear 251 is connected to a crank handle 25 which extends out from the casing 21. A release button 24 is connected to the casing 21 and the shaft 23 is located beneath the release button 24 so that when pushing the release button 24, the shaft 23 is moved and the fishing line wrapped on the spool portion 22 is released.

A control device includes a plate 30 which is pivotally connected to the body 20 at an intermediate portion thereof and a first end of the plate 30 is a hook 33 which is disengagably engaged with the groove 231 in the shaft 23. The casing 21 has a slot 210 and a second end 32 of the plate 30 extends out from the slot 210 so that the user may pull the second end 32 of the plate 30 and remove the hook 33 from the groove 231 to release the engagement of the shaft 23 and the plate 30.

When the hook 33 is engaged with the groove 231, even if the release button 24 is unintentionally touched, the shaft 23 cannot rotate so that the fishing line will not be released.

While we have shown and described the embodiment in accordance with the present invention, it should be clear to those skilled in the art that further embodiments may be made without departing from the scope of the present invention.

What is claimed is:

1. A fishing reel comprising:

a casing and a body received in said casing, a spool portion connected to a first side of said body and a shaft of said spool portion extending from a second side of said body, a groove defined in an outer periphery of said shaft, a pinion co-axially connected to said shaft, a gear engaged with said pinion and connected to a crank handle, a release button connected to said casing and said shaft located beneath said release button, and a plate pivotally connected to said body and a first end of said plate having a hook which is disengagably engaged with said groove of said shaft.

2. The fishing reel as claimed in claim 1, wherein said casing has a slot and a second end of said plate extends out from said slot.

* * * * *